Figure 1:
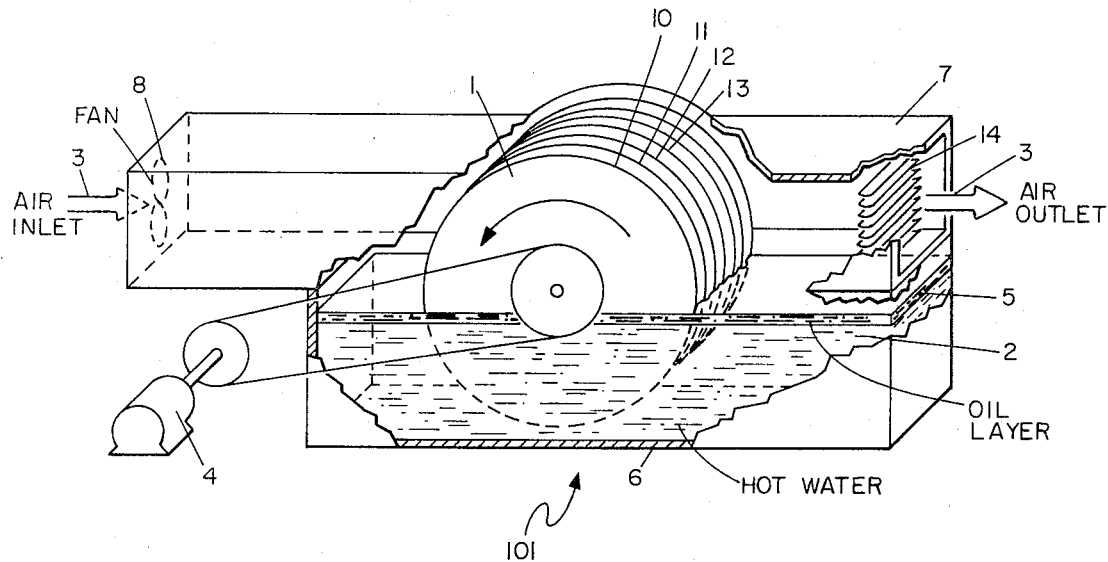

United States Patent [19]
Glicksman

[11] 3,804,155
[45] Apr. 16, 1974

[54] GAS-LIQUID PERIODIC HEAT EXCHANGER

[75] Inventor: Leon R. Glicksman, Peabody, Mass.

[73] Assignee: Massachusetts Institute of Technology, Cambridge, Mass.

[22] Filed: Jan. 24, 1973

[21] Appl. No.: 326,314

[52] U.S. Cl............................ 165/1, 165/5, 165/6, 165/133, 261/DIG. 11
[51] Int. Cl............................................ F28d 19/00
[58] Field of Search................ 165/5, 6, 7, 133, 01; 261/DIG. 11

[56] References Cited
UNITED STATES PATENTS
1,741,726  12/1929  Murray................................. 165/5
3,164,205  1/1965  Dingus................................... 165/6

Primary Examiner—Albert W. Davis, Jr.
Attorney, Agent, or Firm—Arthur A. Smith, Jr.; Robert Shaw; Martin M. Santa

[57] ABSTRACT

A gas-liquid periodic heat exchanger wherein evaporation of the liquid into the gas is minimized. The heat exchanger contains a rotating disc or other matrix which alternately contacts the liquid and the gas and thereby transfers heat from one fluid medium to the other. The surface of the matrix is treated to prevent the liquid from wetting the surface of the matrix as it passes from the liquid to the gas, thereby eliminating evaporation of the liquid into the gas.

8 Claims, 2 Drawing Figures

GAS-LIQUID PERIODIC HEAT EXCHANGER

The present invention relates to heat exchangers and, more particularly, to gas-liquid periodic heat exchangers.

Industrialized nations of the world are experiencing a significant growth in the requirements for cooling in connection with electric power generation, process industries, air conditioning and the like. To minimize thermal pollution, large water-cooled heat exchangers will not be allowed on many waterways. One alternate to water-cooled heat exchangers is evaporative coolers. Evaporative cooling systems consume appreciable amounts of water and produce in some instances ground fog over neighboring areas. As the number of generating facilities increase new facilities will be prohibited from using evaporative systems because the available water supply will be exhausted. Within thirty years if all power plant cooling is done by evaporative cooling, the water consumed will be equivalent to one percent of the total U.S. surface runoff. Since power consumption and generating facilities are concentrated in a small portion of the country, the fraction of regional surface runoff used for evaporative cooling will be much higher.

Due to these factors, cooling by use of dry cooling towers is becoming more prevalent. In currently available dry towers heat is exchanged between a fluid and air which are physically separated, e.g., the fluid is contained within a tube and air flows over the tube wall. The physical separation prevents evaporation; however, dry cooling towers are prohibitively expensive in some instances because of the large expanse of tube surface required. In electric power plants, use of currently available dry cooling towers will raise the total cost of the plants by about twenty percent over the cost of a similar plant employing river water cooled condensers. The high cost of dry cooling towers coupled with the growth of the electric power industry means that a substantial investment will be required for such towers. For example, in this country the electric power industry doubles its capacity approximately every ten years. The annual capital expenditure of the power industry is over ten percent of the total capital expenditures of all United States industries.

Accordingly, a principal object of the present invention is to provide a heat exchanger system which has a performance and water consumption similar to a dry system but whose complexity and costs approach an evaporative system.

A further object is to provide a heat exchanger system of the above characteristics which can be used to transfer heat between a gas and a liquid.

These and still further objects are discussed in the description that follows and are delineated in the appended claims.

The objects of the invention are attained in a gas-liquid, heat-exchange system wherein a matrix is continually moved from a liquid to a gas and then back to the liquid, thereby transferring heat from one fluid to the other.

The surface of the liquid and the surface of the matrix are treated to minimize or prevent adherence of the liquid to the matrix surface. In the initial working model of the invention, a multiple-disc rotor is used as a matrix; approximately 40 percent of the rotor is at all times in contact with the liquid (which is water) and the other portion of the rotor is at all times in contact with a moving gas (which is air). As the rotor rotates from water to air, a thin layer of oil floating on the top of the water preferentially coats the surface of the rotor (or the surfaces of the discs) and thereby prevents the water from adhering to that surface and being evaporated into the air. The oil also prevents evaporation from the free surface of the liquid.

Figure 2:
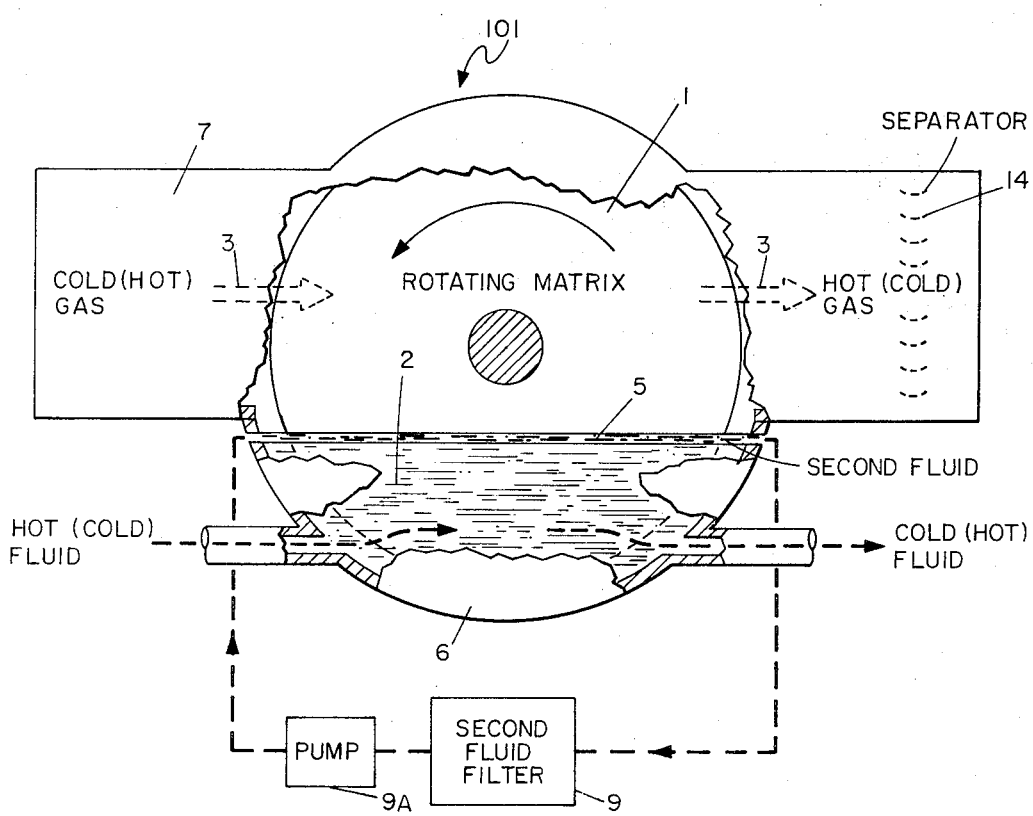

The invention is hereinafter explained with reference to the accompanying drawing in which:

FIG. 1 is an isometric view, partially cutaway and schematic in form, of a preferred embodiment of a gas-liquid, heat exchanger embodying the present inventive concepts; and FIG. 2 is an elevation view, partially cutaway and schematic in form, of a slight modification of the system of FIG. 1

A gas-liquid periodic heat exchanger system of the present invention is shown, generally, and labeled 101 in FIGS. 1 and 2. The system includes a matrix 1 which is shown in the form of a multi-disc rotor comprising the discs labeled 10, 11, 12 and 13, etc. The rotor 1 is shown with the lower portions of the discs 10, 11...immersed in a first liquid labeled 2 (which is water) at one temperature and the upper portions of the discs 10, 11...in contact with a gas (which is air represented by arrows 3) at another temperature. The rotor 1 is rotated by an electric motor 4 so that portions thereof are continually moved from contact with one fluid to contact with the other fluid.

In the absence of some provision to prevent the water from wetting the rotor surface, adherence would occur and the water 2 would evaporate into the air 3. To prevent that from occurring a second fluid, labeled 5, which can be a light non-detergent mineral oil (e.g., Rubrex 100 marketed by Mobil) is floated upon the water. The fluid 5 must be adapted to coat preferentially the surface of the matrix 1 as it passes from the first liquid 2 to the gas 3, thereby preventing the first liquid from being attached to the surface of the matrix 1 and evaporating into gas.

The system 101 includes a container 6 to hold the water with the oil 5 floating on the surface and a chamber 7, the latter being merely a duct through which the air driven by a fan 8 is guided across the surface of the rotor 1. The oil is circulated from the left to the right hand side of the container 6 by the rotor motion. The oil is skimmed off and circulates through the element numbered 9 in FIG. 1, which serves to filter and clean the oil 5. The oil is returned to the container by means of a pump 9A. A group of vanes 14 serve as a separator at the gas-exhaust end of the chamber 7 to remove from the gas any of the oil which may become entrained.

Heat exchangers using a rotor or rotating matrix for gas-to-gas heat transfer have been used in gas turbines; this type of heat exchanger is described generally in a book by Kays and London entitled "Compact Heat Exchangers" (Second edition pages 27 et seq. and elsewhere), McGraw-Hill, 1964.

The advantage of a periodic heat exchanger over a conventional fixed heat exchanger, e.g., shell and tube, is the cost of the matrix or rotor surface is much less: conventional finned tubes cost approximately one dollar per square foot of total heat exchanger area; whereas matrix surface costs ten to twenty cents per square foot of heat exchanger area.

In gas-to-gas periodic heat exchangers there are problems of leakage of one gas to the other if the gases are at substantially different pressures. Also the rotating matrix traps some of the gas from one side and carries it over to the other side. Elaborate seals must be used to minimize leakage in gas turbine applications.

In the present invention, the gas and liquid are at essentially the same pressure and the oil prevents any direct contact between liquid and gas; seals are not necessary. A simple low cost matrix surface can be used to practice the invention. For a dry cooling tower, over fifty percent of the total cost is in the heat exchanger surface. Therefore, the present design substantially reduces the overall cost of the cooling tower. The heat transfer and pressure drop at the matrix surface should be substantially the same as for a conventional dry heat exchanger. Thus, the present system has a performance similar to a conventional dry heat exchanger with a substantially reduced cost.

The foregoing system may be operated without the use of a second fluid (e.g., oil) and still give the same performance if the rotor or other matrix surface is coated with a very thin coating of Teflon or other like coating, it being kept in mind that any such coating used must be one to which water will not adhere and, further, it must be thin enough to allow transfer of heat between the fluids and the rotor. Matrix surfaces similar to those used in gas to gas periodic or rotary heat exchanges, e.g., Corning Cercor, can be employed rather than the discs to make the overall system more compact.

Further modifications of the invention will occur to persons skilled in the art and all such modifications are within the spirit and scope of the invention as defined by the appended claims.

What is claimed is:

1. A gas-liquid heat-exchanger system that comprises, in combination, a moving matrix, means for moving the matrix into contact with a first liquid at one temperature and thence to a gas at another temperature, as alternate conditions, thereby to transfer heat from one fluid to the other, and a second liquid disposed on the surface of the first liquid and adapted to coat preferentially the surface of the matrix as it passes from the first liquid to the gas side of the system, thereby to prevent the first liquid from being attached to the surface of the matrix and evaporating into the gas.

2. A system as claimed in claim 1 that includes container means to hold the second liquid on the first liquid and in which the matrix is a multi-disc rotatable member, a portion of the matrix, in operating apparatus, being in contact with the first liquid and a further portion being in contact with the gas, portions of the rotating member thereby continually being moved from contact with one fluid to contact with the other fluid.

3. A system as claimed in claim 2 in which the first liquid is water, the second liquid is light non-detergent mineral oil, and the gas is air.

4. A system as claimed in claim 2 that includes a chamber positioned above the container means and means for moving the gas into and out of the chamber and over said further portion of the rotatable member.

5. A system as claimed in claim 4 that further includes a separator at the gas-exhaust end of the chamber to remove from the gas any of the second fluid which may be entrained.

6. A system as claimed in claim 3 having means for circulating the second liquid from one side of the container means to the other and having provision for continually filtering and cleaning the second fluid.

7. A gas-liquid heat-exchanger system that comprises, in combination, a matrix, means for moving the matrix into contact with a liquid at one temperature and thence to a gas at another temperature, as alternate conditions, thereby to transfer heat from one fluid to the other, the surface of the matrix being coated to prevent the liquid from adhering thereto and evaporating into the gas.

8. A method of effecting exchange of heat between a liquid and a gas while nevertheless minimizing evaporation of the liquid into the gas, that comprises: effecting movement of a portion of a matrix into thermal contact with the liquid and then with the gas as alternate conditions, thereby to transfer heat from one fluid to the other, and coating the surface of the matrix with a very thin layer of a material which allows transmission of heat from one fluid to the other but which resists adherence of the liquid thereto, thereby to provide good exchange of heat between the two fluids but a minimum of evaporation of the liquid, thereby to provide good exchange of heat between the two fluids but a minimum of evaporation of the liquid into the gas.

* * * * *